United States Patent [19]

Brown

[11] Patent Number: 5,809,661
[45] Date of Patent: Sep. 22, 1998

[54] MECHANISM FOR ANCHORING A MEASURING TAPE

[76] Inventor: Greg M. Brown, 27 Imperial La., Scarborough, Me. 04074

[21] Appl. No.: 813,905

[22] Filed: Mar. 7, 1997

[51] Int. Cl.⁶ ....................................................... G01B 3/10
[52] U.S. Cl. .................................. 33/758; 33/755; 33/770
[58] Field of Search .............................. 33/758, 755, 756, 33/768, 770

[56] References Cited

U.S. PATENT DOCUMENTS

| 338,410 | 3/1886 | Herline, Jr. | 33/758 |
| 2,711,030 | 6/1955 | Drew et al. | 33/758 |
| 5,458,946 | 10/1995 | White, Jr. | 33/757 |
| 5,481,813 | 1/1996 | Templeton | 33/770 |

FOREIGN PATENT DOCUMENTS

| 179657 | 9/1954 | Germany | 33/755 |

Primary Examiner—Christopher W. Fulton
Attorney, Agent, or Firm—Frederick R. Cantor, Esq.

[57] ABSTRACT

A measuring tape anchorage device can be secured to a ground surface or pavement surface to facilitate the taking of distance measurements, e.g. at automobile accident scenes or for surveying activities. The anchorage device includes an anchorage block having a swivel connection to the subsurface, and two cylindrical mandrel elements spaced from one end of the anchorage block, so that a portion of the tape can be looped around one of the cylindrical elements and then curled over the other cylindrical element before extending away from the anchorage block. Pulling forces on the tape cause the cylindrical elements to be drawn together so as to increase the grip force of the cylindrical elements on the tape.

13 Claims, 2 Drawing Sheets

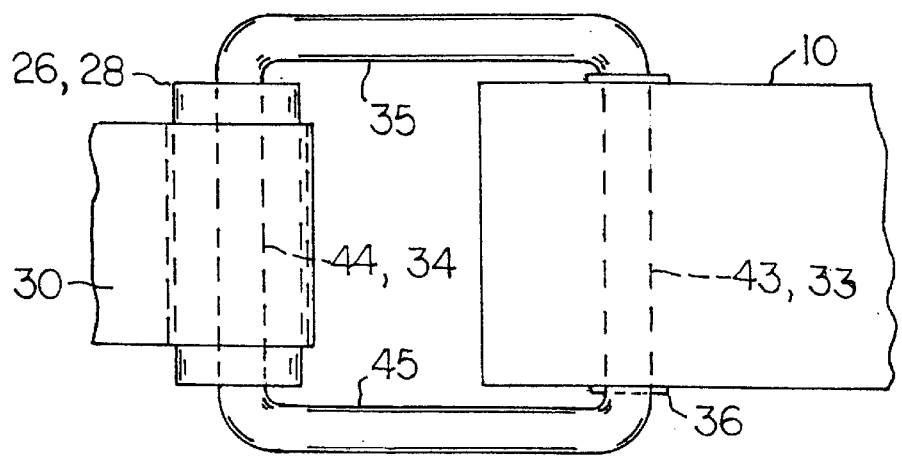
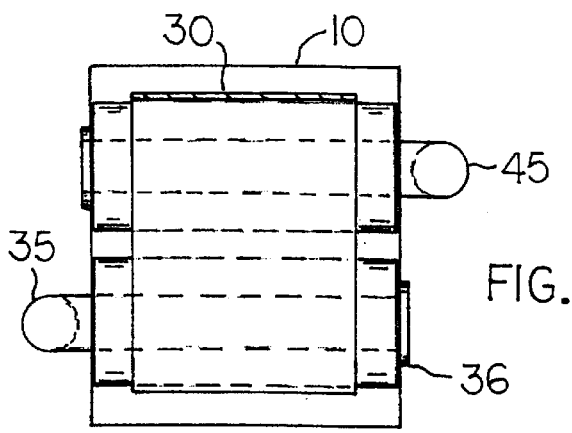
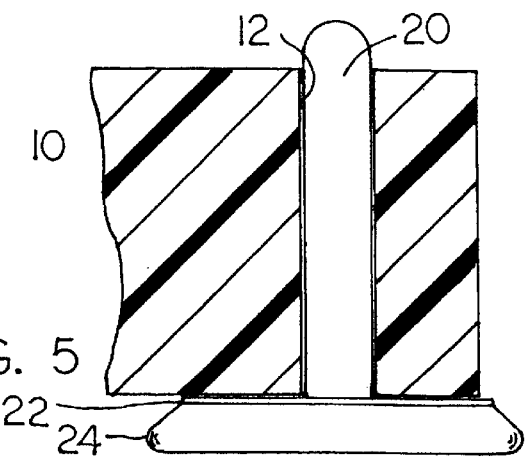

MECHANISM FOR ANCHORING A MEASURING TAPE

BACKGROUND OF THE PRESENT INVENTION

Summary of the Present Invention

The present invention relates to a mechanism for anchoring a measuring tape. The mechanism can be used for measuring distances associated with traffic accidents, crime scenes, surveying plots and plans, and other distances that are commonly measured with a conventional measuring tape.

When measuring distances with a conventional cloth measuring tape, a common procedure is for one person to hold one end of the measuring tape while another person unwinds the tape and moves toward the distant point that is to be measured. The procedure, thus, requires the involvement of two persons.

The present invention relates to a mechanism or device for anchoring the measuring tape, such that a single person can use the tape for distance measuring purposes. A second person is, therefore, not required.

A feature of the invention is that the mechanism is adapted to grip the tape at any point along the length dimension of the tape. This feature facilitates the measurement of specific distances for comparing the relative distances of two different points from a common third point, or the measurement of distances that are a multiple of the measuring tape length.

Another feature of the invention is that when the anchoring mechanism is in its anchored position the measuring marks on the tape face upwardly. This facilitates easy reading of the tape by a person standing over the tape and looking down at the tape markings.

A further feature of the invention is that the anchoring mechanism can have a swivel mounting on an anchoring pin, such that the tape can be extended in various different directions from the swivel point. Measurements can be taken in different directions from the anchoring point without adjusting the relationship between the tape and the anchoring mechanism.

An additional feature of the present invention is that the anchoring mechanism grips the measuring tape without wrinkling the tape or otherwise weakening the tape material. The anchoring mechanism can be attached to the tape and detached from the tape an indefinite number of times without injuring or creasing the tape.

Further features of the invention will be apparent from the attached drawings and description of the illustrative embodiments of the invention.

In summary, and in accordance with the above discussion, the foregoing objectives are achieved in the following embodiments.

1. A mechanism for anchoring a measuring tape to a stationary surface comprising:
   an anchorage member;
   a first cylindrical tape gripping element carried by said anchorage member;
   a second cylindrical tape gripping element swingably attached to said anchorage element for movement toward or away from said first tape gripping element;
   said cylindrical tape gripping elements having parallel axes; said second cylindrical tape gripping element being swingable in a plane normal to said parallel axes, so that the cylindrical surfaces of said tape gripping elements remain parallel to one another in different adjusted positions of said second element; and
   said first cylindrical element being adapted to have a measuring tape looped therearound, said second cylindrical element being adapted to receive thereon overlapped tape sections coming from said first cylindrical element.

2. The anchoring mechanism, as described in paragraph 1, wherein said cylindrical elements are positionable in close proximity so that the looped portion of the tape wraps around approximately seventy-five percent of the circumference of said first cylindrical element.

3. The anchoring mechanism, as described in paragraph 2, wherein said cylindrical elements are proportioned so that the overlapped tape sections wrap around approximately twenty-five percent of the circumference of said second cylindrical element.

4. The anchoring mechanism, as described in paragraph 1, wherein each cylindrical element has an outer cylindrical surface formed of an elastomeric material.

5. The anchoring mechanism, as described in paragraph 1, wherein said cylindrical elements have the same diameter.

6. The anchoring mechanism, as described in paragraph 1, wherein each cylindrical element comprises a metal rod and a cylindrical elastomeric sleeve telescoped onto said metal rod.

7. The anchoring mechanism, as described in paragraph 6, wherein each metal rod has a diameter of about one-eighth inch, and each elastomeric sleeve has an outer diameter of about five-sixteenths inch.

8. The anchoring mechanism, as described in paragraph 1, wherein said cylindrical tape gripping elements have their parallel axes extending horizontally when said anchorage member is in an anchored position, such that measuring marks on the tape face upwardly for reading purposes.

9. A mechanism for anchoring a measuring tape to a stationary surface comprising:
   an anchorage block;
   a first tape gripper member that includes a first U-shaped metal rod having first and second parallel rod sections, and a third connector rod section normal to said parallel rod sections; said first tape gripper member further comprising a first elastomeric sleeve telescoped onto said second rod section; said first rod section extending transversely through said anchorage block so that said first elastomeric sleeve is spaced from the block surface;
   a second tape gripper member that includes a second U-shaped metal rod having fourth and fifth parallel rod sections, and a sixth connector rod section normal to said fourth and fifth rod sections; said second tape gripper member further comprising a second elastomeric sleeve telescoped onto said fifth rod section; said fourth rod section extending transversely through said anchorage block so that said second elastomeric sleeve is spaced from the block surface; and
   said fourth rod section being parallel to said first rod section; said fourth rod section having a swivel fit in said anchorage block so that said second tape gripper member can be swung toward or away from said first tape gripper member to vary the spacing between said first and second elastomeric sleeves.

10. The mechanism, as described in paragraph 9, wherein said second tape gripper member has a first position wherein said second elastomeric sleeve is spaced away from said first elastomeric sleeve; and said second tape gripper member having a second position wherein said second elastomeric sleeve is closely adjacent to said first elastomeric sleeve.

11. The mechanism, as described in paragraph 9, wherein said second tape gripper member has a tape loading position wherein a measuring tape can be looped around said first elastomeric sleeve; and said second tape gripper member having a second tape gripper position wherein the looped portion of the tape is drawn partially around said second elastomeric sleeve and then away from said anchorage block.

12. The mechanism, as described in paragraph 9, wherein said first tape gripper member is attached to a lower portion of said anchorage block, and said second tape gripper member is attached to an upper portion of said anchorage block, whereby said first elastomeric sleeve is located directly below said second elastomeric sleeve when said second sleeve is swung to a position of minimal sleeve spacing.

13. The mechanism, as described in paragraph 9, and further comprising a vertical hole in said anchorage block adapted to have a swivel fit on a stationary anchorage pin, whereby the tape can be extended in various different directions away from said vertical hole.

BRIEF DESCRIPTION OF THE DRAWINGS

FIG. 3, is a fragmentary top plan view, of the FIG. 2 mechanism.

FIG. 4, is a left end view, of the FIG. 2 mechanism.

FIG. 5, is a fragmentary sectional view, taken in the same direction as FIG. 1, but illustrating another embodiment of the invention.

DESCRIPTION OF THE PREFERRED EMBODIMENTS OF THE PRESENT INVENTION

Figure 1:
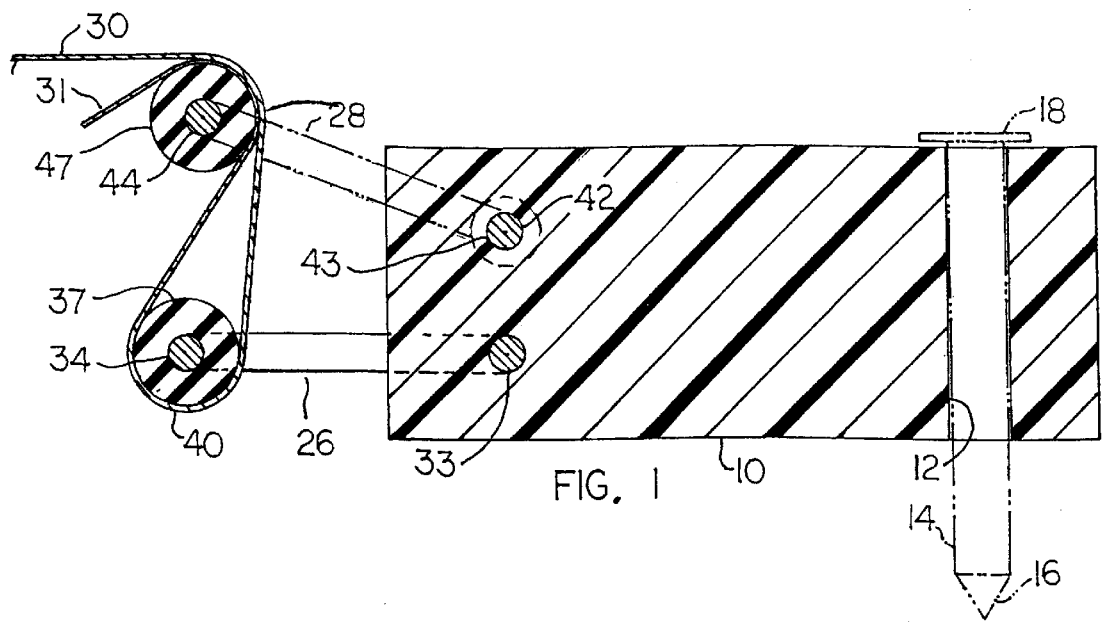
FIG. 1, is a longitudinal sectional view, taken through a tape anchoring mechanism embodying the invention.

FIG. 1, is a longitudinal sectional view, taken through a tape anchoring mechanism embodying the invention.

The drawings show a preferred embodiment of the invention, that comprises an anchorage block 10 having a vertical hole 12 therein adapted to receive an elongated circular pin 14 for holding the block in position on a ground surface. The pin 14 can have a pointed lower end 16 and an enlarged head 18, whereby the pin can be hammered into the ground, or other stationary surface, e.g. a wooden floor or a tar road surface. The use of a circular anchor pin 14 is advantageous in that the anchorage block 10 has a swivel mounting on the pin. The block can be extended from pin 14 in any direction, i.e. north, east, south or west, or any other direction, whereby distance measurements can be taken in any direction from the swivel axis.

FIG. 5, is a fragmentary sectional view, taken in the same direction as FIG. 1, but illustrating another embodiment of the invention.

FIG. 5, shows an alternate mounting device for anchorage block 10. Hole 12 in the anchorage block receives a circular pin 20 that is affixed to a circular disk 22 that is attached to a closed bag 24. The bag is filled with sand, steel pellets, or other granular material, that enables the bag to conform to surface contours of the pavement, floor or other surface on which the bag is placed. The bag filler material gives the bag sufficient weight as to hold pin 20 in a fixed upright position, in spite of lateral pulling forces that might be exerted on the pin. As with the arrangement of FIG. 1, the anchorage block 10 can swivel on the upstanding pin 20. Bag 24 can be sized to give pin 20 the desired stability.

Two tape gripper members 26 and 28 are mounted on the anchorage block 10 to extend away from the mounting hole 12. These tape gripper members are designed to grip a conventional cloth measuring tape 30, whereby the tape can be extended away from the mounting hole 12 to measure distances to remote points.

Tape gripper member 26 comprises a U-shaped metal rod 32 having a first rod section 33 extending transversely through anchorage block 10, a second rod section 34 extending parallel to rod section 33 beyond the left end of block 10, and a third connector rod section 35 extending normal to rod sections 33 and 34. A head 36 can be provided on the end of rod section 33 to prevent member 26 from separating from block 10.

A sleeve 37, formed of a resilient elastomeric material, is telescoped onto rod section 34 to form a gripper surface for a looped portion 40 of the cloth measuring tape 30. Elastomeric sleeve 37 has a frictional or adhesive fit on rod section 34, such that the sleeve is non-rotatable on the rod section. Also, rod section 33 has a friction fit in the associated hole in block 10, such that the tape gripper member 26 has a stationary horizontal position. Rod section 33 could rotate in the mounting hole in block 10 while still practicing the invention. However, in preferred practice of the invention, tape gripper member 26 has a fixed horizontal position relative to block 10.

Tape gripper member 28 comprises a second U-shaped metal rod 42 having a fourth rod section 43 extending transversely through block 10, a fifth rod section 44 extending parallel to rod section 43 beyond the left end of block 10, and a sixth connector rod section 45 extending normal to rod sections 43 and 44. A head 46 can be provided on the end of rod section 43 to prevent member 28 from separating from block 10.

A second sleeve 47, formed of a resilient elastomeric material, is telescoped onto rod section 44 to form a gripper surface for the tape measure 30. Sleeve 47 is affixed to rod section 44, e.g. by adhesives or a frictional fit. Rod section 43 has a tight swivel fit in the associated mounting hole in block 10, whereby tape gripper member 28 can be swung around the axis of rod section 44 by grasping block 10 and applying downward manual thumb pressure on sleeve 47. Also, the tape gripper member 28 can be swung upwardly beyond the FIG. 1 position by exerting an upward lifting force on sleeve 47.

Figure 2:
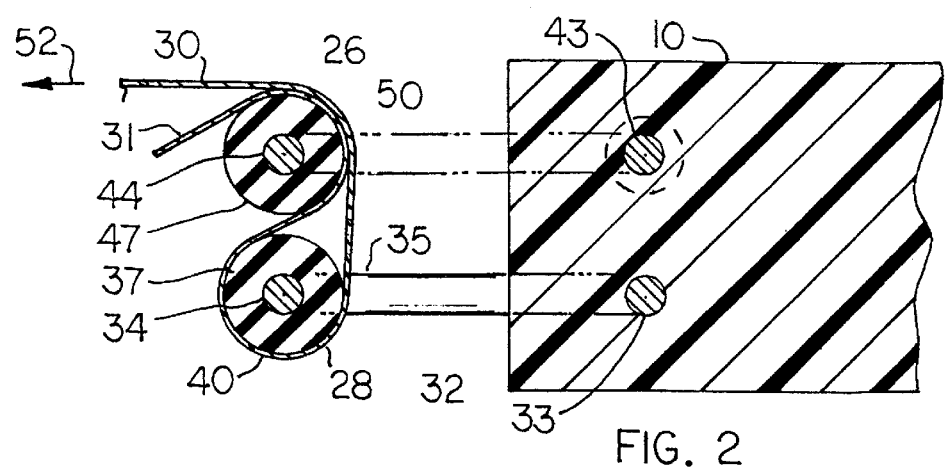
FIG. 2, is a fragmentary sectional view, taken in the same direction as FIG. 1, but with the mechanism in a tape gripping condition.

FIG. 2, is a fragmentary sectional view, taken in the same direction as FIG. 1, but with the mechanism in a tape gripping condition.

As shown in FIG. 1, cylindrical tape gripper sleeve element 47 is spaced a relatively great distance from cylindrical tape gripping sleeve element 37. FIG. 2 shows cylindrical tape gripping element 47 swung downwardly around the axis of rod section 43 to a position having minimal spacing relative to cylindrical tape gripping element 37.

As shown in FIG. 2, loop section 40 of the cloth measuring tape 30 encircles about seventy-five percent of the circumferential surface of cylindrical element 37. The tape has two overlapping tape sections 50 wrapped around approximately twenty-five percent of the circumferential surface of cylindrical element 47. These frictional engagements between the tape and cylindrical elements 47 and 37 are sufficient to keep the tape anchored to gripper elements 26 and 28, even when substantial pulling forces 52 are exerted on the tape.

In FIGS. 1 and 2, the terminal end of measuring tape 30 is referenced by numeral 31. The major length dimension of the tape extends leftwardly from the tape gripper member 28 in the arrow 52 direction. Since anchorage block 10 has a swivel mounting on pin 14 (or pin 20), the tape can extend away from anchorage block 10 in any desired direction.

In order to connect the measuring tape 30 to tape gripping members 26 and 28 the upper gripping member 28 is lifted upwardly to at least the FIG. 1 position; member 28 is lifted far enough so that cylindrical element 47 has a substantial spacing from cylindrical element 37. When the lifting force is removed, cylindrical element 47 maintains the position to which it has been lifted.

Tape 30 can be doubled back onto itself to form the loop 40. Loop 40 is then placed around cylindrical element 37, with the doubled back portion (or doubled thickness portion) of the tape located in the space between cylindrical element 47 and the left end of anchorage block 10. Tape gripper member 28 is then swung down to the FIG. 2 position, and any slack in the double thickness portion of the tape is removed, i.e. by pulling the tape. The tape then assumes the condition depicted in FIG. 2.

In the FIG. 2 condition the measuring tape is frictionally locked to cylindrical gripping elements 37 and 47 so that the tape can readily be drawn taut to measure distances from the swivel mounting pin 14 or 20 and distant objects. The cylindrical gripping elements 37 and 47 are preferably of sufficient diameter so that no kinks or creases are formed in the tape. The anchorage mechanism can be used any number of times without injuring or damaging the tape.

Cylindrical tape gripping elements 37 and 47 can have a range of different diameters, while still practicing the invention. Typically, each cylindrical element 37 or 47 will have an outside diameter of about five-sixteenths of an inch. The diameter of the metal rod used with such a cylindrical sleeve element will be about one-eighth of an inch. The elastomeric sleeve surface has the necessary resilience and frictional properties to achieve the necessary grip on the cloth tape, even though the tape usually has a glossy plastic coating having a relatively low coefficient of friction.

It should be noted from FIG. 2 that pulling forces in the arrow 52 direction tend to draw the cylindrical gripper elements 37 and 47 closer together; this has the effect of causing the cylindrical gripper elements to generate reactive pressure forces on the tape, whereby the frictional grip exerted by cylindrical elements 37 and 47 on the tape increases in response to incremental increases in the arrow 52 force.

The tape anchoring mechanism is preferably sized so that cylindrical gripper element 47 is spaced from swivel mount 14 or 20 by approximately the tape length needed to form loop 40 and the overlapped tape areas 50. When the tape is stretched to measure the distance from the swivel point to some distant object the reading on the tape will correspond to the actual distance that is to be measured.

Cylindrical elements 37 have their parallel axes located horizontally, such that the markings on the tape face upwardly. A person standing, or kneeling, alongside the tape at the distant point can look downwardly to readily read the tape.

In most instances the tape will be anchored to gripper members 26 and 28 at an area of the tape located proximate to the terminal end 31 of the tape. However the tape can be anchored to gripper members 26 and 28 at any desired point along the tape longitudinal dimension. For example, if it were desired to make specific distance measurements, e.g. twenty feet, from the swivel point 14 or 20 in several radial directions, the tape might be anchored to gripper members 26 and 28 at the twenty foot mark. The terminal free end of the tape could be used to mark the twenty foot distance.

FIG. 3, is a fragmentary top plan view, of the FIG. 2 mechanism.

FIG. 4, is a left end view, of the FIG. 2 mechanism.

As shown in FIGS. 3 and 4, each U-shaped tape gripper member 26 or 28 has its connector rod portion 35 or 45 alongside a different side surface of anchorage block 10. However, this is not critical to practice of the invention. The U-shaped members 26 and 28 could be oriented so that connector rod portions 45 and 35 are directly above one another at the same side of block 10. The two U-shaped members 26 and 28 are preferably of identical construction, such that cylindrical members 47 and 37 are in direct vertical alignment when members 47 and 37 are minimally spaced apart, as shown e.g. in FIG. 2. Preferably each cylindrical member 47 and 37 has the same outside diameter.

The drawings necessarily show a specific form of the invention. However, it will be appreciated that the invention can be practiced in various forms and configurations.

The present invention, described above, relates to a mechanism for anchoring a measuring tape. Features of the present invention are recited in the appended claims. The drawings contained herein necessarily depict structural features and embodiments of the mechanism for anchoring a measuring tape, useful in the practice of the present invention.

However, it will be appreciated by those skilled in the arts pertaining thereto, that the present invention can be practiced in various alternate forms, proportions, and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

I claim:

1. A mechanism for anchoring a measuring tape to a stationary surface comprising:

an anchorage member;

a first cylindrical tape gripping element carried by said anchorage member;

a second cylindrical tape gripping element swingably attached to said anchorage element for movement toward or away from said first tape gripping element;

said cylindrical tape gripping elements having parallel axes; said second cylindrical tape gripping element being swingable in a plane normal to said parallel axes, so that the cylindrical surfaces of said tape gripping elements remain parallel to one another in different adjusted positions of said second element; and said first cylindrical element being adapted to have a measuring tape looped therearound, said second cylindrical element being adapted to receive thereon overlapped tape sections coming from said first cylindrical element.

2. The anchoring mechanism, as described in claim 1, wherein said cylindrical elements are positionable in close proximity so that the looped portion of the tape wraps around approximately seventy-five percent of the circumference of said first cylindrical element.

3. The anchoring mechanism, as described in claim 2, wherein said cylindrical elements are proportioned so that the overlapped tape sections wrap around approximately twenty-five percent of the circumference of said second cylindrical element.

4. The anchoring mechanism, as described in claim 1, wherein each cylindrical element has an outer cylindrical surface formed of an elastomeric material.

5. The anchoring mechanism, as described in claim 1, wherein said cylindrical elements have the same diameter.

6. The anchoring mechanism, as described in claim 1, wherein each cylindrical element comprises a metal rod and a cylindrical elastomeric sleeve telescoped onto said metal rod.

7. The anchoring mechanism, as described in claim 6, wherein each metal rod has a diameter of about one-eighth inch, and each elastomeric sleeve has an outer diameter of about five-sixteenths inch.

8. The anchoring mechanism, as described in claim 1, wherein said cylindrical tape gripping elements have their parallel axes extending horizontally when said anchorage member is in an anchored position, such that measuring marks on the tape face upwardly for reading purposes.

9. A mechanism for anchoring a measuring tape to a stationary surface comprising:

an anchorage block;

a first tape gripper member that includes a first U-shaped metal rod having first and second parallel rod sections, and a third connector rod section normal to said parallel rod sections; said first tape gripper member further comprising a first elastomeric sleeve telescoped onto said second rod section; said first rod section extending transversely through said anchorage block so that said first elastomeric sleeve is spaced from the block surface;

a second tape gripper member that includes a second U-shaped metal rod having fourth and fifth parallel rod sections, and a sixth connector rod section normal to said fourth and fifth rod sections; said second tape gripper member further comprising a second elastomeric sleeve telescoped onto said fifth rod section; said fourth rod section extending transversely through said anchorage block so that said second elastomeric sleeve is spaced from the block surface; and said fourth rod section being parallel to said first rod section; said fourth rod section having a swivel fit in said anchorage block so that said second tape gripper member can be swung toward or away from said first tape gripper member to vary the spacing between said first and second elastomeric sleeves.

10. The mechanism, as described in claim 9, wherein said second tape gripper member has a first position wherein said second elastomeric sleeve is spaced away from said first elastomeric sleeve; and said second tape gripper member having a second position wherein said second elastomeric sleeve is closely adjacent to said first elastomeric sleeve.

11. The mechanism, as described in claim 9, wherein said second tape gripper member has a tape loading position wherein a measuring tape can be looped around said first elastomeric sleeve; and said second tape gripper member having a second tape gripper position wherein the looped portion of the tape is drawn partially around said second elastomeric sleeve and then away from said anchorage block.

12. The mechanism, as described in claim 9, wherein said first tape gripper member is attached to a lower portion of said anchorage block, and said second tape gripper member is attached to an upper portion of said anchorage block, whereby said first elastomeric sleeve is located directly below said second elastomeric sleeve when said second sleeve is swung to a position of minimal sleeve spacing.

13. The mechanism, as described in claim 9, and further comprising a vertical hole in said anchorage block adapted to have a swivel fit on a stationary anchorage pin, whereby the tape can be extended in various different directions away from said vertical hole.

* * * * *